US010015588B1

(12) United States Patent
Lu et al.

(10) Patent No.: US 10,015,588 B1
(45) Date of Patent: Jul. 3, 2018

(54) BEAMFORMING OPTIMIZATION FOR RECEIVING AUDIO SIGNALS

(71) Applicant: Verizon Patent and Licensing Inc., Arlington, VA (US)

(72) Inventors: Youhong Lu, Irvine, CA (US); Ravi Kalluri, San Jose, CA (US); Andrew Walters, San Jose, CA (US); Luigi Bojan, Orlando, FL (US); Yadong Wang, Campbell, CA (US); Vasanthi Vuppuluri, Sunnyvale, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 15/384,598

(22) Filed: Dec. 20, 2016

(51) Int. Cl.
*H04R 3/00* (2006.01)
*H04R 1/40* (2006.01)
*G10L 15/22* (2006.01)
*H04R 3/04* (2006.01)

(52) U.S. Cl.
CPC ............ *H04R 1/406* (2013.01); *G10L 15/22* (2013.01); *H04R 3/005* (2013.01); *H04R 3/04* (2013.01); *G10L 2015/223* (2013.01); *H04R 2201/403* (2013.01)

(58) Field of Classification Search
CPC .......... H04R 1/406; H04R 3/04; H04R 3/005; H04R 2201/403; H04R 25/30; H04R 25/00; H04R 25/01; H04R 29/00; H04R 5/02; G10L 15/22; G10L 2015/223; H04L 27/01; H04B 7/17; H04B 15/00; H04B 3/20; H04B 3/23; H04M 1/00; G10K 11/16; H03G 5/00; H03G 5/005; H03G 5/16; H03G 5/165; H03G 5/24; H03G 5/28; H03G 9/005; H03G 9/24; H03G 9/025; H03G 2201/702; H03G 7/007
USPC ..... 381/13, 16, 23, 23.1, 26, 56, 57, 61, 66, 381/313, 316, 320, 321, 71.1, 71.3, 71.6, 381/71.11, 71.12, 71.13, 71.14, 73.1, 74, 381/79, 86, 91, 92, 94.1, 94.2, 94.3, 94.5, 381/94.6, 94.9, 95, 97, 98, 99, 100, 101, 381/102, 103, 1, 10, 111, 112, 113, 114, 381/115, 119, 122, 123; 379/406.01–406.16; 455/596.2, 570; 704/E19.014, E21.002, E21.007; 700/94
See application file for complete search history.

(56) References Cited

U.S. PATENT DOCUMENTS

| | | | | |
|---|---|---|---|---|
| 2005/0195988 A1* | 9/2005 | Tashev, IV | ............ | H04R 3/005 381/92 |
| 2012/0093344 A1* | 4/2012 | Sun | ........................ | H04R 3/005 381/122 |
| 2017/0280235 A1* | 9/2017 | Varerkar | ................ | H04R 1/406 |

* cited by examiner

*Primary Examiner* — Leshui Zhang

(57) ABSTRACT

Techniques, described herein, may enable a computing device (e.g., a set-top-box, a user equipment (UE), etc.) with an array of sensors (e.g., microphones, antennas, etc.) to engage in beamforming in a manner that optimizes the signal strength of the target signal. For example, the computing device may create an optimized beam pattern by applying a pre-selected band width to a steering direction of the target signal. The beam width may include steering vectors at equal, angular distances from the steering direction, enabling steep transition slopes to be applied to the optimized beam pattern. In some implementations, the beam width and transition slopes may be standardized, such that the optimized beam pattern for any signal may be uniform, regardless of variables such as frequency and time.

20 Claims, 10 Drawing Sheets

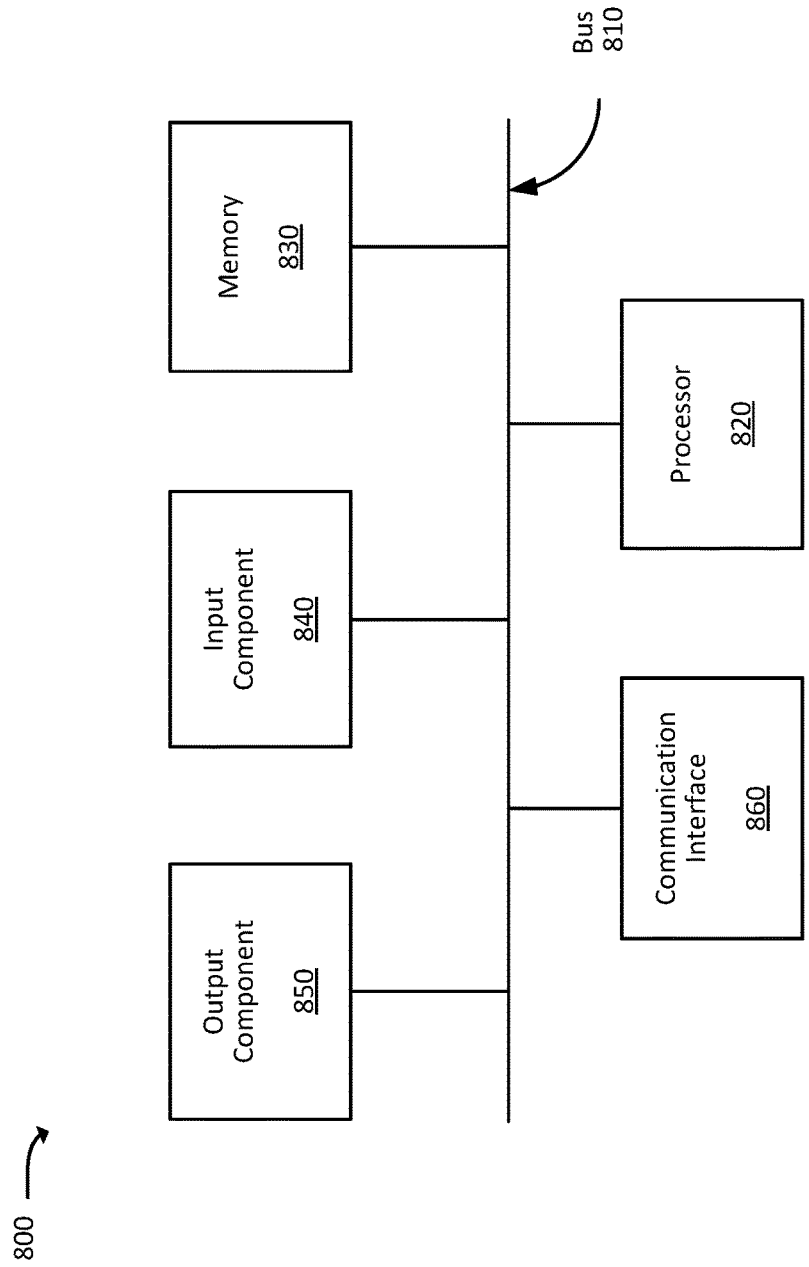

BEAMFORMING OPTIMIZATION FOR RECEIVING AUDIO SIGNALS

BACKGROUND

Beamforming (BF) may include a signal processing technique implemented by systems and devices with sensor arrays (e.g., microphones, antennas, etc.) for directional signal transmission and/or reception. An example of BF is adaptive beamforming, which may include processing inputs from a sensor array to determine a direction of arrival (DOA) of a signal of interest (also referred to herein as a target signal) and making efforts to cancel signal interference (e.g., noise, background talking, reverberation, etc.). An objective of beamforming may include achieving good, or high-quality, band-pass spatial filtering (BPSF), which may include completely blocking any type of interference that may obfuscate the target signal for applications using the target signal.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 8 is a block diagram of example components of a device.

DETAILED DESCRIPTION OF PREFERRED EMBODIMENTS

Figure 1A:
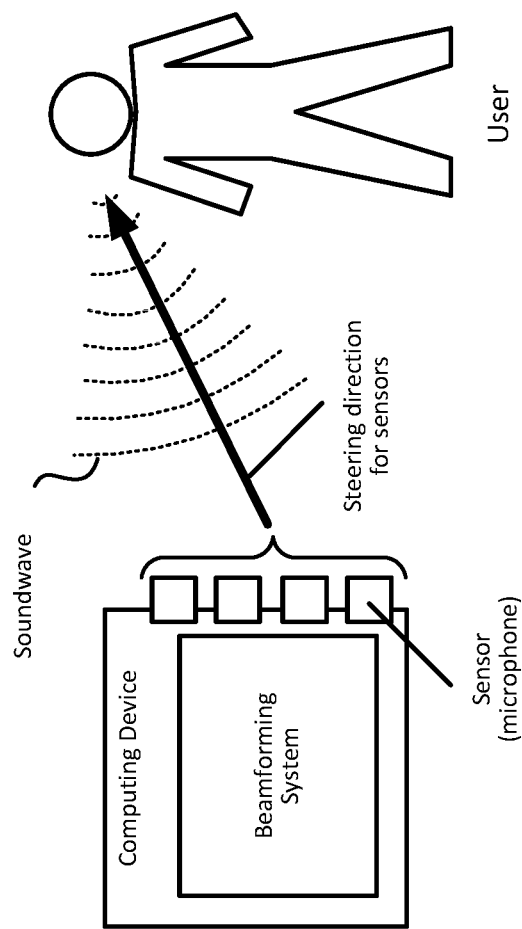
FIGS. 1A-1C is are diagrams of an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Beamforming (BF) may include a signal processing technique to extract a particular signal (referred to herein as a target signal) from inputs from an array of sensors (e.g., microphones, antennas, etc.). BF may include a technique referred to as beam steering, which may involve determining the direction of arrival (DOA) of a particular signal and weighting different signals, associated with the different sensors, based on the DOA of the signal. For example, beam steering may include: 1) receiving inputs from an array of sensors; 2) assuming or guessing that a signal came from a particular DOA; 3) synchronizing the inputs of each sensor by adjusting the inputs based on the travel time (e.g., speed of sound) and relative position of each sensor; 3) summing the synchronized (or in-phase) inputs (e.g., calculating the mean output of the signal array); and 4) determining whether the summed inputs are consistent with a target signal (e.g., a signal within a particular frequency range, with an adequate gain, etc.).

If the assumed DOA is wrong, interference (competing signals, reverberation, noise, etc.) may attenuate or obfuscate the target signal. However, as the assumed DOA is more accurate, the sensor inputs may interact more constructively, such that the signal-to-noise ratio (SNR) of the combined signals increases and the target signal becomes more pronounced. Since the initial DOA may be somewhat of a guess, the beam steering technique may be repeated using different DOAs (e.g., until a SNR threshold is satisfied, a pre-selected quantity of iterations is exhausted, a pre-selected duration has expired, etc.). When multiple beamforming iterations are performed, the DOA corresponding to the strongest signal may be designated as the steering direction for that signal. The level of precision with which the determined beam steering direction is the actual or precise DOA may depend on factors, including the number of iterations performed, the incremental angular change of each iteration, etc.

In some scenarios, additional techniques may be used to try and increase the quality of the signal extracted from the sensor array inputs. An example of such a technique may include minimum variance distortion response (MVDR). MVDR may include placing a null value in all directions except for the steering direction. As such, when the steering direction (i.e., the estimated direction from whence the signal was received) is accurate, MVDR may increase the quality of the target signal by causing interference to be nulled. By contrast, inasmuch as the steering direction is not accurate, MVDR may cause the target signal to be inadvertently attenuated as the target signal (or portions thereof) are nulled (which is sometimes referred to as "self-nulling". As such, whether MVDR increases or decreases the quality of the signal extracted from the sensor array may depend on whether the steering direction is accurate.

Considering the accuracy-dependence of the steering direction for MVDR, certain BF techniques may be implemented to decrease the likelihood of self-nulling. An example of such a technique may include diagonal loading (DL). DL may include an attempt to expand an area around the determined DOA. For instance, DL may include modifying a mathematical matrix, corresponding to the estimated DOA, to include a broader area, such that the self-nulling of MVDR might not become a problem. However, DL may be a relatively blunt technique to prevent self-nulling since, even when the steering direction is off and DL helps prevent self-nulling, DL may also prevent the nulling of interference, such as noise and reverberation that adversely affect the quality of the target signal.

Additionally, DL may include other limitations, such as: 1) not providing a way of standardizing beam width from one target signal to another since the beam width of DL is often based on signal-specific variables such as frequency and time; 2) imposing an undesirable tradeoff between beam transition (which may refer to a degree of precision (or specificity) with which a signal is extracted in accordance with a designated beam width) and signal interference; and 3) inconsistent beam patterns that vary based on signal frequency, time, etc. These and other limitations of DL can be exacerbated in scenarios where multiple target signals are received by the sensor array (e.g., when an array of microphones are detecting audio signals from multiple people).

Techniques described herein may be used to enhance the quality, precision, and uniformity with which a directionally specific signal (i.e., a signal received from a particular direction) maybe extracted from inputs from an array of sensors (e.g., microphones, antennas, etc.). For example, a computing device (e.g., a set-top-box, a media console system, a user equipment (UE), an Internet-of-Things (IoT) device, etc.) may include an array of microphones capable of receiving audio inputs from people in the vicinity. The microphones may relay the audio inputs to a beamforming system capable of extracting audio signals received by the array of microphones, in a manner that addresses one or more of the limitations described above with respect to, for example, MVDR and DL. For instance, the beamforming system may apply pre-selected beam widths and transition slopes to create beam patterns (also referred to herein as optimization objects) that better ensure target signals are isolated from signal interference with a high degree of precision. Additionally, the beamforming system may standardize beam patterns (also referred to herein as optimization solutions) so that, for example, each target signal may be extracted with a desired level of quality regardless of the time or frequency corresponding to the target signal. Additionally, while one or more of the examples, discussed herein, may be provided in terms of audio inputs from a person, the techniques described herein may also be applicable to scenarios involving other inputs, for example, antenna signals.

Figure 1B:
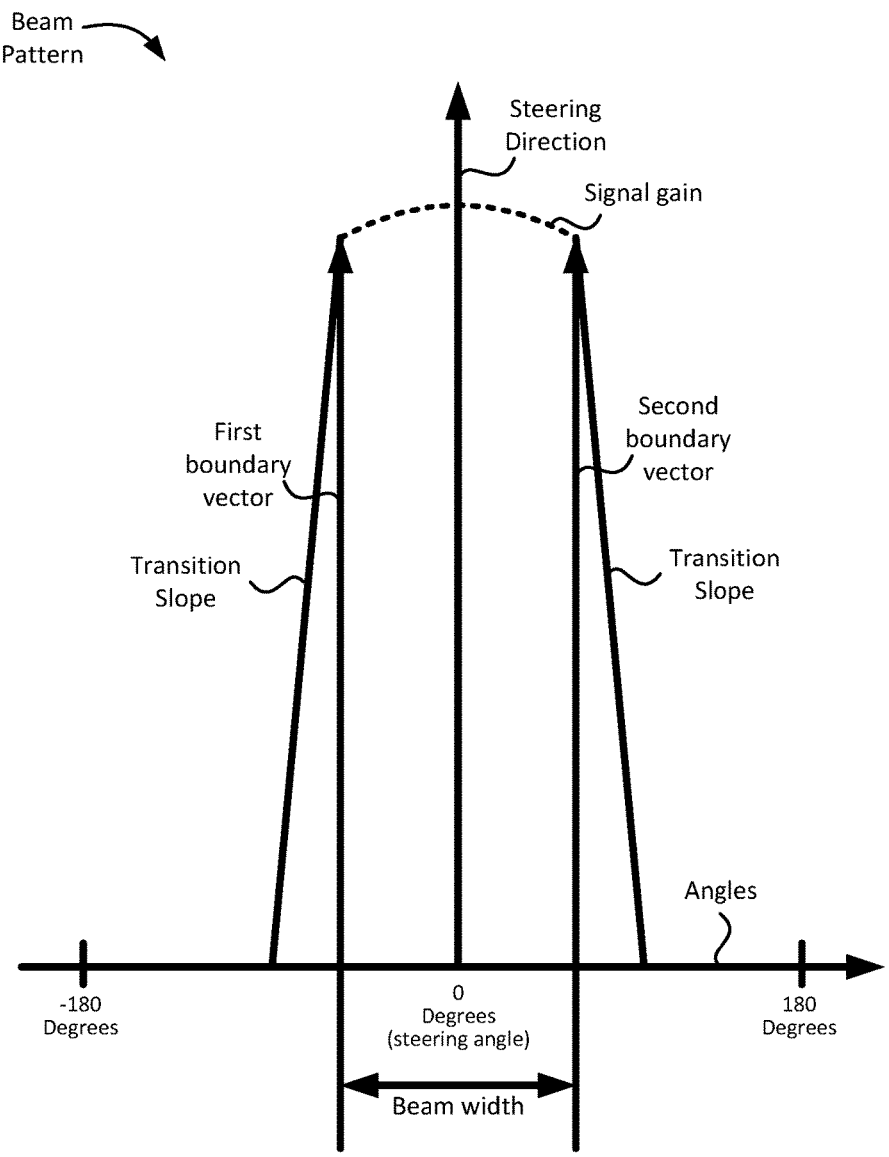
Figure 1C:
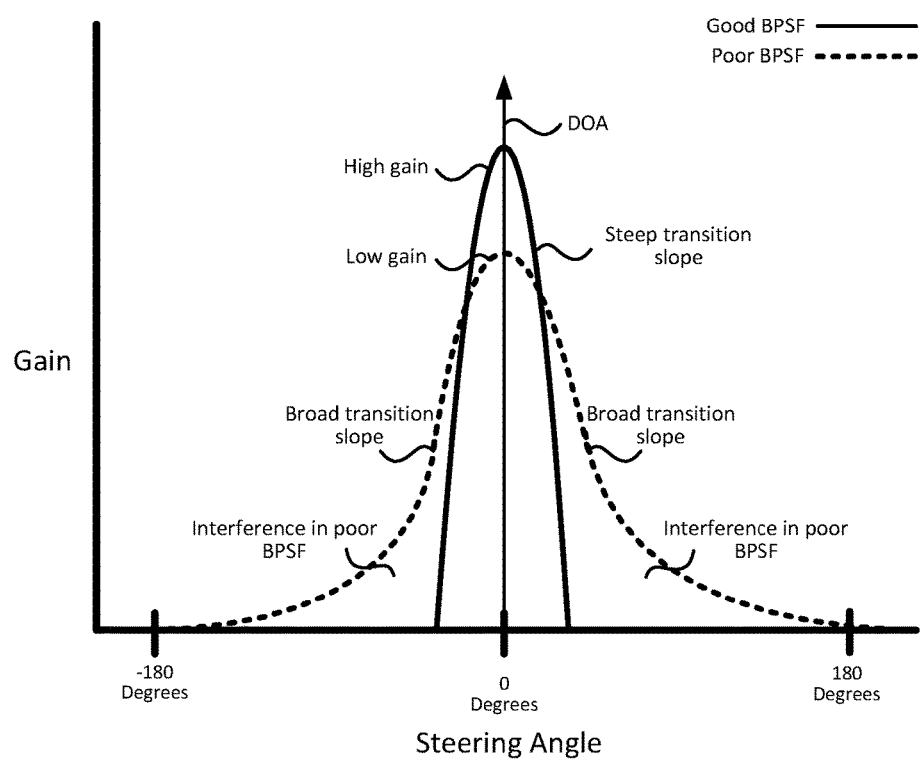

FIGS. 1A-1C illustrate an example overview of an implementation described herein. As shown, a computing device (e.g., a set-top box, a media console, a user equipment (UE) device, etc.) may include a beamforming system and a sensor array (e.g., microphones, antennas, etc.). The computing device may be in an area where a user is speaking (e.g., providing audio commands to the computing device). The sensor array may detect the soundwaves and provide a corresponding input to the beamforming system. The beamforming system may analyze the input from the sensor array and determine a beam pattern for extracting a directionally specific signal corresponding to the voice of the user.

As shown in FIG. 1B, the beam pattern (also referred to herein as an optimization object) may include a steering direction that corresponds to the DOA of the audio commands from the user, a signal gain representing the strength of the signal received, a beam width defined by a first vector and a second vector, and transition slopes on either side of the beam width vectors. The vectors may include a column vector expressed as an angular shift measured from angle of the steering direction. The transition slopes may be based on a pre-selected slope, which may be based (at least in part) on a mathematical constant that ensures that the slope is steep. The beamforming system may extract a signal, from the sensor array input, based on the beam pattern. The first and second vectors may enable the beamforming system to abruptly define clean boundaries for excluding (e.g., nulling) signals, interference, etc., from the target signal (e.g., the voice of the user). Additionally, as the transition slopes may be determined based on a pre-selected constant, the transition slopes may be relatively steep thereby helping to exclude signal interference that might otherwise be included in the extracted signal.

FIG. 1C is a diagram of an example of beamforming with good beam-pass spatial filtering (BPSF) and poor BPSF. As shown, the beamforming with poor BPSF includes a reduced gain, a broader beam width, and gentle transition slopes, which may be an example of beamforming using diagonal loading (DL). By contrast, the beamforming with good BPSF example may include an elevated gain, a narrower beam width, and steep transition slopes. The techniques described herein may be used to conduct beamforming in a manner consistent with the good BPSF example.

Figure 2:
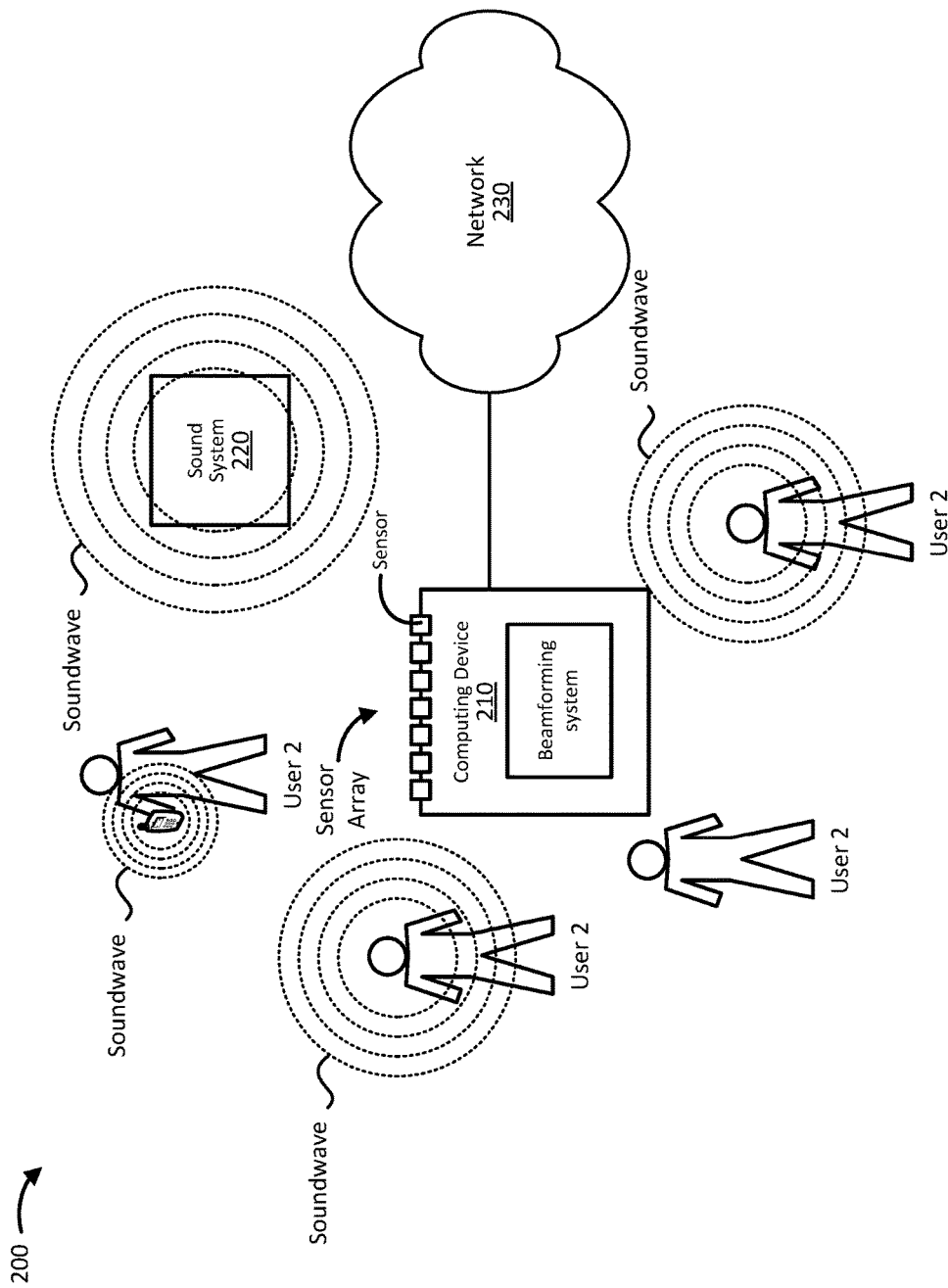
FIG. 2 is a diagram of an example environment in which systems and/or methods described herein may be implemented.

FIG. 2 is a diagram of an example environment 200 in which systems and/or methods described herein may be implemented. Environment 200 may include computing device 210, sound system 220, network 230, and one or more users.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another device of environment 200. Additionally, the devices of environment 200 may interconnect with each other, and/or other devices, via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

Computing device 210 may include one or more computing and/or communication devices, such as a set-top-box, a medial console system, a user equipment (UE), an Internet-of-Things (IoT) device, etc. Computing device 210 may include an array of sensors, such as antennas, microphones, etc. Computing device 210 may also include a beamforming system that enables computing device 210 to perform one or more of the operations described herein. For example, computing device 210 may determine a beam pattern (also referred to herein as an optimization solution) for extracting a signal based on the DOA of the signal. The beam pattern may include a steering direction, a gain, a pre-selected beam width, and steep transition slopes on either side of the beam width. The beam width and the transition slopes may be designated (or controlled) by pre-selected mathematical constant so as to limit competing signals, noise, and interference from obfuscating the target signal. In some implementations, the beam pattern may correspond to an audible signal (e.g., soundwaves) originating from a particular user, a communication device (e.g., a UE) operated by the user, sound system 220 (e.g., a stereo system, a home entertainment system), etc. The audio signals may include audio commands from a user. In some implementations, the beam pattern that corresponds to other types of signals and devices.

Network 230 may include one or more devices that facilitate or enable communications between various devices shown in environment 200 (e.g., computing devices 210 and network 230). Examples of network 230 may include routers, modems, gateways, switches, hubs, etc. Network 230 may be arranged and configured to interconnect the computing device 210 and network 230 in one or more ways, in addition to providing a connection between the data center and network 230.

Figure 3:
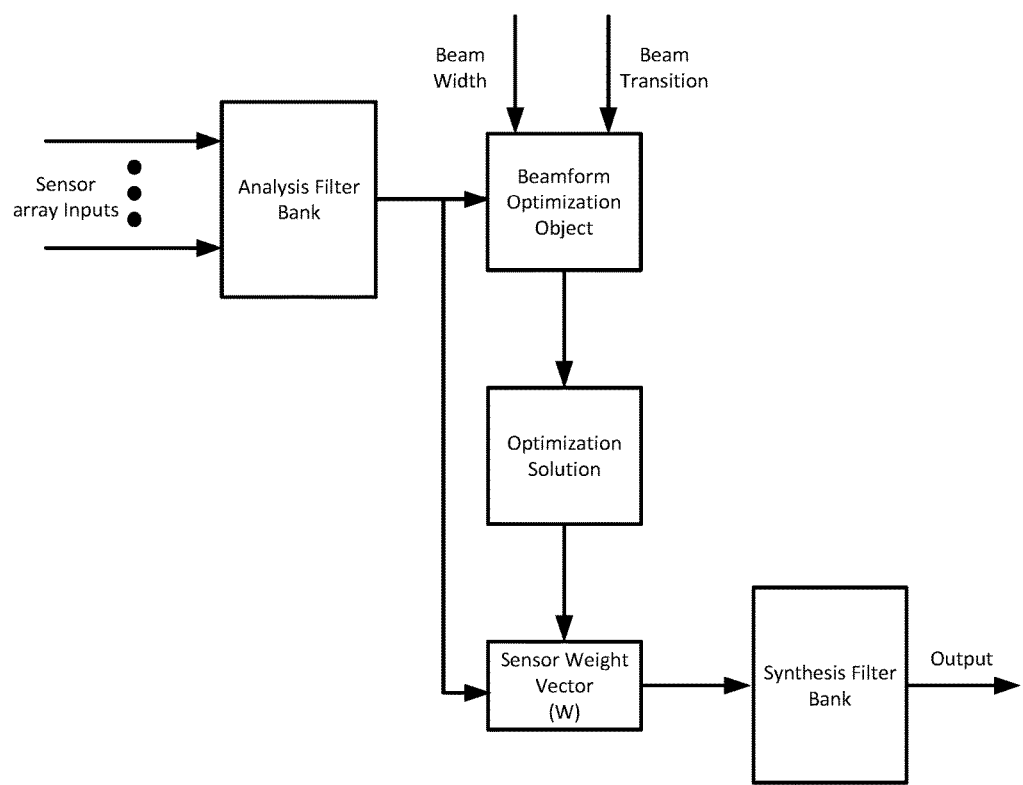
FIG. 3 is a diagram of an example implementation of beamforming in accordance with the optimization techniques described herein.

FIG. 3 is a diagram of an example implementation of beamforming in accordance with the optimization techniques described herein. Five blocks are shown in the example: Analysis Filter-Bank, Beamingforming Optimization Object, Optimization Solution, Sensor Weight Vector, and Synthesis Filter-Bank.

As shown, Analysis Filter-Bank receives signals from an array and outputs processed signals. The processing is converting time-domain signals to time-frequency domain signals. Thus, inputs to BeamingForming Optimization Object are a set of frequency-band signals at that time. BeamingForming Optimization Object uses array inputs and pre-selected beam-width and beam-transition to form optimization object with a pre-selected DOA range (e.g., 360 degrees around the sensor array of computing device 210) and/or according to a range of frequencies (e.g., audio signal frequencies, radio signal frequencies, or a combination thereof). Optimization solution is derived from the Optimization Solution block, which outputs a weight vector to Sensor Weight Vector block, where the outputs from Analysis Filter-Band are filtered via the weight vector and forms inputs of Synthesis Filter-Bank, which are a set of frequency signals of desired target signal. Synthesis Filter-Bank converts the set of frequency signals in that time to time-only signal at the time.

The analysis bank may implement known technologies corresponding to techniques, such as DFT filter-bank, etc. The analysis bank may convert each input signal to a time-frequency domain and analyze each converted input according to a frequency bandwidth scheme. If there are M signals from M microphones, each signal may be transformed into a time-frequency band with N bands (N being selected according to processing capacity, system resources, etc.) covering a sample rate of frequencies (Fs) from 0 to Fs/2. In such a scenario, if Fs=16000 Hz and N=80, 80 bands may be used with a bandwidth of each band being 100 Hz. The narrower the bandwidth, the better the signal processing performance may be because more reverberation may be addressed (e.g., recognized and disregarded) by the analysis of the input signals. As shown in FIG. 3, an output from the analysis filter bank may be used to create a beamform optimization object that includes controlled beam widths and beam transitions.

Figure 4:
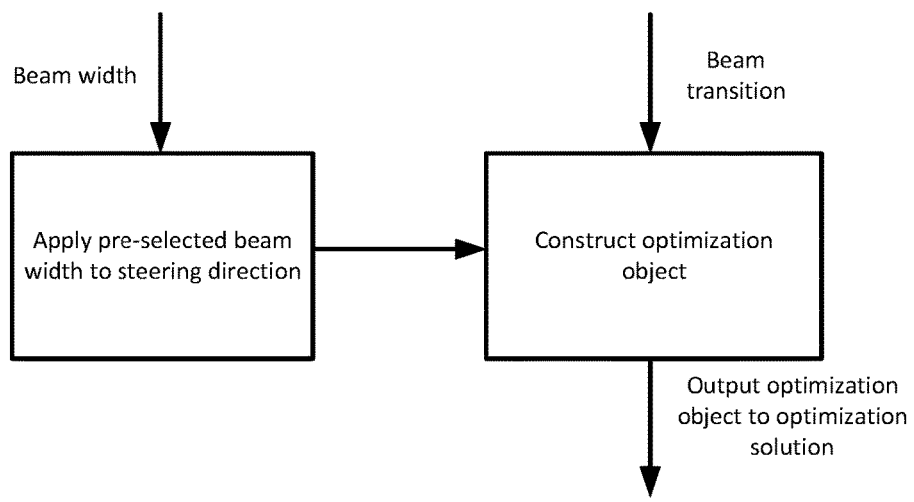
FIG. 4 is a diagram of an example implementation for creating an optimization object and optimization solution in accordance with the optimization techniques described herein.

FIG. 4 is a diagram of an example implementation for creating an optimization object and optimization solution in accordance with the optimization techniques described herein. An optimization object and optimization solution may also be referred to herein as a beam pattern that is created using one or more of the optimization techniques described herein. As shown, a beam width may be applied to a steering direction for the target signal. In some implementations, the beam width may be expressed as steering vectors (e.g., a left-most steering direction and a right-most steering direction) that are positioned at equal angular distances from the steering direction determined by a DOA algorithm or pre-selected range. For instance, if the steering direction determined by a DOA algorithm or pre-selected range is positioned at 0 degrees, the beam width may include one steering vector positioned at −2.5 degrees and another steering vector positioned at 2.5 degrees, for a total beam width of 5 degrees. In some implementations, additional vectors may be used to help define the beam width. The general steering condition (e.g., steering direction of target signal, beam width, etc.) may be expressed as a steering direction matrix as follows:

$$A(f,\delta)^H W(f,n) = \Delta$$

where $A(f, \delta)$ is a steering matrix consisting of column vectors of: $a(f, \delta_i)$ $1 \ll i \ll MM$ (number of columns), $\delta$ is any steering direction angle or center angle, f is signal frequency, n is signal time, $( \ldots )^H$ is a complex transpose operation, $W(f, n)$ is a column weight vector, and $\Delta$ is a column vector. In some implementations, the steering vectors used to define the other conditions, such as amplitude variations, may also be expressed by the steering direction matrix, which may be significant since amplitude variations may exist in different practical devices. As shown, transition parameters may be used to determine transition slopes for the signal.

The steering direction, beam width, and transition slope may be combined to create an optimization object. In some implementations, the beam transition slope may be determined based on a predetermined function, such as $c(slop) = S_{TH} * slop$, where $S_{TH}$ is a constant. The optimization object may be an expression that includes the steering direction, beam width, and beam transition. For instance, under conditions, such as $A(f, \delta)^H W(f, n) = \Delta$, the optimization object, $J(f, n)$, may be expressed as:

$$J(f,n) = W(f,n)^H R(f,n) W(f,n) + \varepsilon(f,n,E,\text{slop}) W(f,n)^H W(f,n)$$

where $W(f, n)^H$ may represent a complex transpose operation $(( \ldots )^H)$ applied to a column weight vector ($[w_1(f, n)$ $w_2(f, n) \ldots w_M(f, n)]^H$), $R(f, n)$ may represent a M×M matrix (with M representing a number of sensors), and $W(f, n)^H W(f, n)$ may represent white noise gain. Additionally, $\varepsilon(f, n, E, \text{slop})$ may be expressed as:

$$\varepsilon(f,n,E,\text{slop}) = c(\text{slop}) * b(f) * E(n)$$

where $c(\text{slop})$ may represent a proportion of slop, $b(f)$ may represent a function of frequency that equalizes the beam width for all frequencies (by, for example, setting $b(f)=f^2$), and $E(n)$ may represent a level of microphone input power at time n.

Figure 5:
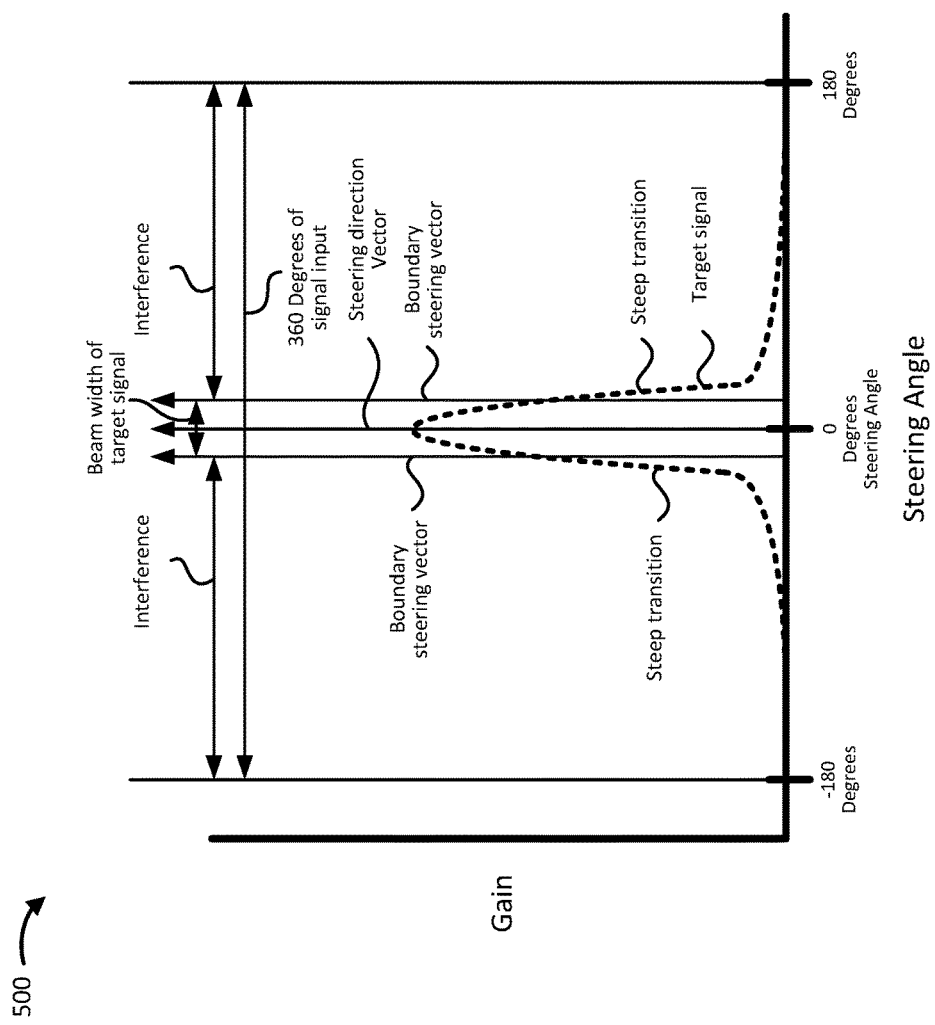
FIG. 5 is a diagram of an example beam pattern in accordance with the optimization techniques described herein.

FIG. 5 is a diagram of an example beam pattern 500 in accordance with the optimization techniques described herein. As shown, beam pattern 500 may include a steering direction with a beam width defined by a boundary steering vector on each side of the beam steering direction. With a well-defined beam width, beam pattern 500 may also include steep transition slopes that may help enable signal interference to be canceled or ignored during the beamforming process. For instance, as shown in FIG. 5, the steep transition slopes create large portions of interference (of the 360-degree signal input) to be excluded from the extracted signal. In some implementations, nulling such large portions of interference may help maximize the gain of the target signal that is ultimately extracted from the sensor array inputs.

Returning to FIG. 3, the optimization object may be used to create an optimization solution. The optimization solution may involve minimizing the expression:

$$J(f,n) = W(f,n)^H [R(f,n) + \varepsilon(f,n,E,\text{slop}) I_M] W(f,n) - 2\lambda^H (A(f, \delta)^H W(f,n) - \Delta)$$

where $W(f, n)^H$ may represent a complex transpose operation $(( \ldots )^H)$ applied to a column weight vector ($[w_1(f, n)$ $w_2(f, n) \ldots w_M(f, n)]^H$), $R(f, n)$ may represent a M×M matrix (with M representing a number of sensors), ε(f, n, E, slop) may represent a function based on frequency, time, power of sensor input, and a slope constant, and $W(f, n)^H W(f, n)$ may represent raw white noise gain, and λ may represent a raw vector with MM elements. $I_M$ is an identity matrix with dimension M (e.g., an identity matrix that is a M by M square matrix with ones on the main diagonal and zeros elsewhere. Taking the derivative of the foregoing expression with respect to W, may result in:

$$2R_1(f,n)W - 2A(f,\delta)\lambda = O_M$$

where $O_M$ may be a column vector with all zeros as elements and $R_1(f, n) = R(f, n) + \varepsilon(f, n, E, slop)I_M$. Working from the foregoing derivative, W(f, n) may be expressed as: $W(f, n) = R_1^{-1}(f, n)A(f, n)\lambda$, where $\lambda = [A(f, \delta)^H R_1^{-1}(f, n)A(f, \delta)]^{-1}\Delta = \Gamma^{-1}\Delta$. The expression: $\Gamma = A(f, \delta)^H R_1^{-1}(f, n)A(f, \delta)$ may include an MM by MM matrix to which it may be useful to add a offset, as in:

$$\Gamma = A(f,\delta)^H R_1^{-1}(f,n) A(f,\delta) + \sigma(v)$$

where σ(v) may represent a function and v is the first column and first raw of Γ without the offset to control both beam width and beam transition as specified herein (e.g., regardless of variable such as frequency and time). As such, the optimization solution may include a modification of the optimization object to ensure that beam width and beam transition may be uniform across different frequency. Said another way, the optimization object may ensure a pre-specified beam width and beam transition, and the optimization solution may ensure that the pre-specified beam width and beam transition is consistent across different frequencies. As shown above, a weighted vector W(f, n) is obtained. Output from the analysis filter bank is then filtered via the weighted vector and filtered outputs are expected to be the target signal in frequency domain at that time, which is input to Synthesis Filter-Band.

Outputs of Sensor Weight Vector are optimized output in frequency domain at that time. Optimal means that they are target signal in bands of frequencies at that time. The outputs are inputs to Synthesis Filter-Bank. Synthesis Filter-Bank converts signals in the band of frequencies to a time-only signal via a known technology, for example, a DFT synthesis filter-bank.

In some implementations, the output from the synthesis filter bank may be provided to another component of computing device 210 (or to another device altogether) to be interpreted, stored, and/or processed for other potential uses. For instance, if computing device 210 can interpret and implement audio commands from a user, the output from the synthesis filter bank may be a digital version of the audio command that is sent to an audio signal interpretation component of computing device 210.

Figure 6:
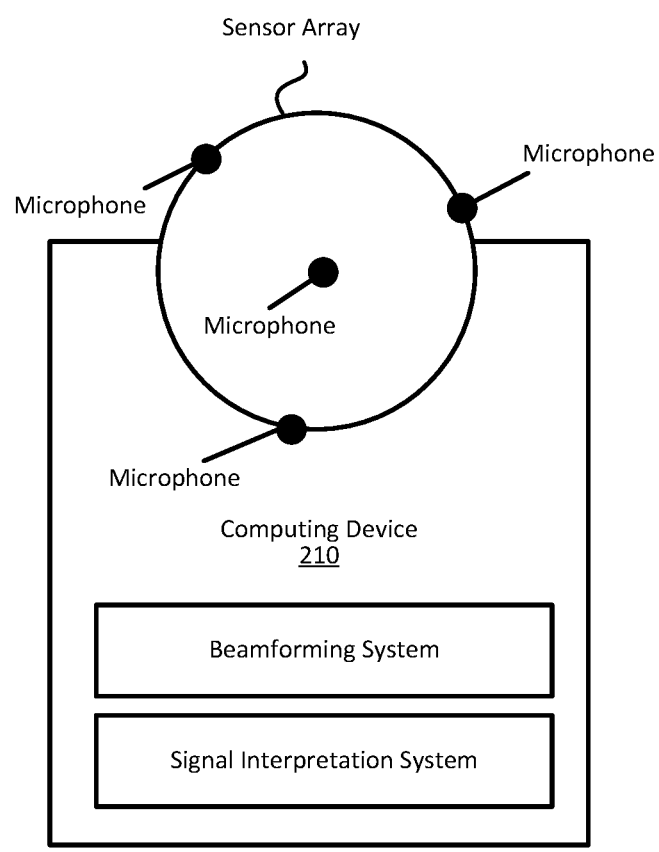
FIG. 6 is a diagram of some of the components of a computing device.

FIG. 6 is a diagram of some of the components of computing device 210. As shown, computing device 210 may include a sensor array, a beamforming system, and a signal interpretation system. Depending on the implementation, computing device 210 may include additional and/or alternative components. The sensor array, beamforming system, and signal interpretation system may be implemented as circuitry, which may include hardware, software, and/or a combination thereof. The function of the beamforming system and signal interpretation system are described herein with reference to FIGS. 3, 4, and 7.

As shown, the sensor array includes four microphones that are arranged in a pattern—three microphones that are equidistance from one another along a circular perimeter and one microphone in the center. This is only one of many possible sensor arrays that may be implemented in accordance with the techniques described herein. For example, in some implementations, different types of sensors may be implemented, a different number of sensors may be implemented, and/or the sensors may be arranged in a different manner (e.g., in a line, on a sphere, on different surfaces, etc.). Additionally, each of these variables (e.g., sensor type, sensor number, sensor arrangement, etc.) may affect the manner in which the techniques, such as determining weighting vectors for sensor inputs, may be implemented.

Figure 7:
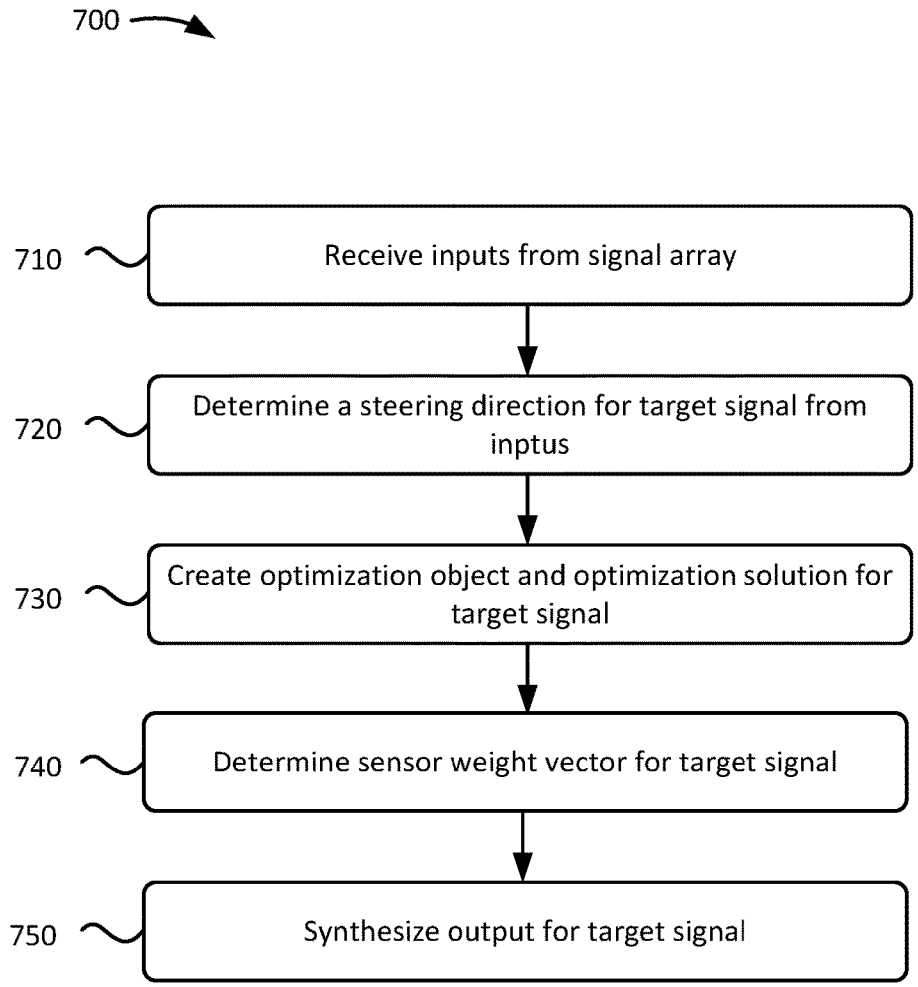
FIG. 7 is a diagram of an example process for beamforming in accordance with the optimization techniques described herein.

FIG. 7 is a diagram of an example process 700 for beamforming in accordance with the optimization techniques described herein. In some implementations, process 700 may be implemented by computing device 210. Process 700 may be discussed below in terms of microphones and soundwaves. However, process 700 may also be applicable to other types of sensors and signals, such as an array of antennas capable of receiving radio waves.

As shown, process 700 may include receiving an input from a signal array (block 710). For example, computing device 210 may include an array of sensors (e.g., microphones, antennas, etc.) that may detect signals and inputs of those signals to a beamforming system of computing device 210.

Process 700 may also include determining a steering direction for a target signal from the inputs (block 720). For example, a DOA analysis module may receive inputs from the Analysis Filter-Bank and may process the inputs in order to: 1) identify a recognizable signal from the inputs; 2) determine a DOA for signal; and 3) determine a steering direction based on the DOA. In some implementations, the DOA analysis module may analyze the inputs for signals in various frequency ranges and potential DOAs. In some implementations, multiple signals, corresponding to similar or different frequency ranges may be identified and processed.

In some other examples, DOA may not be estimated. A space of 360 degrees is divided into several sub-spaces. For example, the space may be divided into 9 sub-spaces, in which each has beam-width 40 degrees and steering directions are at the centers of each segment, respectively. Blocks 730, 740, and 750 may be repeated 9 times, and one from 9 outputs that are more voice-like or in terms of other standards, for example, maximum energy output, may be finally chosen.

In some other examples, one may specify one direction as a steering direction. Many devices use this kind of applications. For example, cell phones may have two microphones such that one is in front and another is in the back of the device. Steering direction may be specified as 0 degrees from the front of the device with a specified beam-width, such as 30 degrees.

Process 700 may also include creating an optimization object and optimization solution for the target signal (block 730). For example, a beamforming system may create an optimization object (or beamforming pattern) for the target signal, which may include the steering direction for the target signal, a beam width that is applied to the steering direction, and a steep transition slope that is applied to the beam width. The beamforming system may also create an optimization solution for the target signal, which may include taking the optimization object and standardizing the beam width and the transition slope, such that the same beam width and transition slope is applied to any target signal regardless of, for example, the frequency and/or reception time corresponding to the target signal.

Process 700 may also include determining a sensor weight vector for the target signal (block 740). For example, the beamforming system of computing device 210 may determine an appropriate weight vector for the inputs from the sensor array. As mentioned above regarding FIG. 3, this may include assigning a weight to the input from each sensor, according to how well the sensor is positioned to receive the target signal. This may depend on different factors, such as: 1) where each sensor is located relative the steering direction, 2) whether the sensor appears to be functioning properly, 3) whether the sensor is superior to other sensors in the array (e.g., more sensitive, 4) whether the sensor is better capable of receiving a particular type of signal (e.g., frequency), 5) whether the sensor corresponds to more advanced model or version, etc.), 7) whether the sensor appears to be receiving a greater portion of interference (e.g., the receiver is closer to another source of sound, device reverberation, etc.), etc. The weight associated with each sensor input may be based on the gain or input power with which the target signal was received.

Process 700 may also include synthesizing an output for the target signal (block 750). For example, computing device 210 may synthesize a unified output signal, representing the target signal, based on a combination of the input signals, optimization object and solutions for each input signal, and the weight assigned to each signal. In some implementations, synthesizing the target signal in this manner may maximize the level of quality (e.g., signal to noise ratio, overall gain, etc.) with which the target signal is extracted from the sensor array inputs. The synthesized output may be sent to a signal interpretation component (e.g., a component for recognizing, interpreting, and implementing audio commands from a user).

FIG. 8 is a diagram of example components of a device 800. Each of the devices illustrated in FIGS. 1A, 2, and 6 may include one or more devices 800. Device 800 may include bus 810, processor 820, memory 830, input component 840, output component 850, and communication interface 860. In another implementation, device 800 may include additional, fewer, different, or differently arranged components. As described herein, a component may be implemented by circuitry, which may include hardware circuitry, software logic, and/or some combination thereof.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 3, 4, 7, and 8 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A computing device comprising:
   an array of microphones to receive soundwaves; and
   circuitry to:
     receive, from the array of microphones, inputs corresponding to the soundwaves received by the array of microphones;
     identify an audio signal from the inputs;
     determine a steering direction for the audio signal, the steering direction corresponding to a direction of arrival (DOA) of the audio signal;
     create a beam pattern, corresponding to the audio signal, by applying a pre-selected beam width and a pre-selected transition slope to the steering direction;
     determine a weighted vector for the inputs based on the created beam pattern; and
     generate an output, representing the audio signal, based on the determined weighted vector applied to the inputs.

2. The computing device of claim 1, wherein the array of microphones is arranged in a circular pattern with at least one microphone in a center of the circular pattern.

3. The computing device of claim 1, wherein the audio signal includes a voice command from a user.

4. The computing device of claim 3, wherein the circuitry is to provide the output to a signal interpretation system of the computing device, and the signal interpretation system is to recognize the output as a voice command from a user and cause the computing device to execute the voice command.

5. The computing device of claim 1, wherein the beam width is set to an amount of less than 10 degrees, with half of the degrees of the beam width allocated to either side of an angle designated to the steering direction.

6. The computing device of claim 1, wherein the beam width includes a boundary steering vector to a first angular side of the steering direction and another boundary steering vector to a second angular side of the steering direction.

7. The computing device of claim 1, wherein, to create the beam pattern the pre-selected beam width and the pre-selected transition slope are standardized in a manner that is independent of a frequency and time corresponding to the audio signal.

8. A method, comprising:
   receiving, by a beamforming system and from an array of microphones, of a computing device, inputs corresponding to soundwaves received by the array of microphones;
   identifying, by the beamforming system, an audio signal based on the inputs;
   determining, by the beamforming system, a steering direction for the audio signal, the steering direction corresponding to a direction of arrival (DOA) of the audio signal;
   creating, by the beamforming system, a beam pattern, corresponding to the audio signal, by applying a pre-selected beam width and a pre-selected transition slope to the steering direction;
   determining, by the beamforming system, a weighted vector for the inputs based on the created beam pattern; and
   generating, by the beamforming system, an output, representing the audio signal, based on the determined weighted vector applied to the inputs.

9. The method of claim 8, wherein the array of microphones is arranged in a circular pattern with at least one microphone in a center of the circular pattern.

10. The method of claim 8, wherein the audio signal includes a voice command from a user.

11. The method of claim 10, further comprising:
    providing, by the beamforming system, the output to a signal interpretation system of the computing device, and
    recognizing, by the interpretation system, the output as a voice command from a user and causing the computing device to execute the voice command.

12. The method of claim 8, wherein the beam width is set to an amount of less than 10 degrees, with half of the degrees of the beam width allocated to either side of an angle designated to the steering direction.

13. The method of claim 8, wherein the beam width includes a boundary steering vector to a first angular side of the steering direction and another boundary steering vector to a second angular side of the steering direction.

14. The method of claim 8, wherein, to create the beam pattern, the method further comprises:
    standardizing the pre-selected beam width and the pre-selected transition slope in a manner that is independent of a frequency and time corresponding to the audio signal.

15. A non-transitory, computer readable medium storing a plurality of processor-executable instructions, wherein executing the processor-executable instructions causes one or more processors to:
    receive, from an array of microphones, inputs corresponding to soundwaves received by the array of microphones;
    identify an audio signal from the inputs;
    determine a steering direction for the audio signal, the steering direction corresponding to a direction of arrival (DOA) of the audio signal;
    create a beam pattern, corresponding to the audio signal, by applying a pre-selected beam width and a pre-selected transition slope to the steering direction;
    determine a weighted vector for the inputs based on the created beam pattern; and
    generate an output, representing the audio signal, based on the determined weighted vector applied to the inputs.

16. The non-transitory, computer readable medium of claim 15, wherein the array of microphones is arranged in a circular pattern with at least one microphone in a center of the circular pattern.

17. The non-transitory, computer readable medium of claim 15, wherein the audio signal includes a voice command from a user.

18. The non-transitory, computer readable medium of claim 15, wherein the beam width is set to an amount of less than 10 degrees, with half of the degrees of the beam width allocated to either side of an angle designated to the steering direction.

19. The non-transitory, computer readable medium of claim 15,
   wherein the beam width includes a boundary steering vector to a first angular side of the steering direction and another boundary steering vector to a second angular side of the steering direction.

20. The non-transitory, computer readable medium of claim 15, wherein, to create the beam pattern, the processor-executable instructions cause the one or more processors to:
   standardize the pre-selected transition slope in a manner that is independent of a frequency and time corresponding to the audio signal.

* * * * *